United States Patent
Marzban et al.

(10) Patent No.: US 12,512,931 B2
(45) Date of Patent: Dec. 30, 2025

(54) NON-COHERENT MODULATION FOR FEDERATED LEARNING

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 375 days.

(21) Appl. No.: 18/186,920

(22) Filed: Mar. 20, 2023

(65) Prior Publication Data
US 2024/0322956 A1   Sep. 26, 2024

(51) Int. Cl.
| | |
|---|---|
| *H04L 5/00* | (2006.01) |
| *H04B 7/06* | (2006.01) |
| *H04W 72/044* | (2023.01) |
| *H04W 72/0453* | (2023.01) |

(52) U.S. Cl.
CPC ......... *H04L 5/0007* (2013.01); *H04B 7/0639* (2013.01); *H04L 5/0023* (2013.01); *H04L 5/0037* (2013.01); *H04W 72/0453* (2013.01); *H04W 72/046* (2013.01)

(58) Field of Classification Search
CPC ... H04L 5/0007; H04L 5/0023; H04L 5/0037; H04B 7/0639; H04W 72/0453; H04W 72/046
See application file for complete search history.

(56) References Cited

U.S. PATENT DOCUMENTS

| | | | |
|---|---|---|---|
| 2022/0405589 A1* | 12/2022 | Sahin | G06N 3/048 |
| 2023/0368514 A1* | 11/2023 | Adeli | G06V 10/955 |
| 2023/0370885 A1* | 11/2023 | Lee | H04B 7/0626 |
| 2024/0195969 A1* | 6/2024 | Rezazadegan Tavakoli | H03M 7/3066 |
| 2024/0419953 A1* | 12/2024 | Wang | H03M 7/3082 |
| 2025/0016619 A1* | 1/2025 | Jeon | H04B 17/309 |
| 2025/0037032 A1* | 1/2025 | Tang | G06N 3/045 |

* cited by examiner

*Primary Examiner* — Yu-Wen Chang
(74) *Attorney, Agent, or Firm* — Procopio, Cory, Hargreaves, & Savitch LLP

(57) ABSTRACT

A UE may identify, in at least one round of a federated learning procedure, at least one gradient update based on local data and a local copy of a machine learning model associated with the federated learning procedure. The UE may transmit, in the at least one round of the federated learning procedure, for a network node, an indication of the at least one gradient update based on a sign of the at least one gradient update and a non-coherent orthogonal modulation scheme. The network node may identify, in at least one round of the federated learning procedure, an accumulated sign of the at least one gradient update based on a first received power associated with the at least one first resource and a second received power associated with the at least one second resource.

30 Claims, 12 Drawing Sheets

NON-COHERENT MODULATION FOR FEDERATED LEARNING

TECHNICAL FIELD

The present disclosure relates generally to communication systems, and more particularly, to transmission of gradient updates for federated learning in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may identify, in at least one round of a federated learning procedure, at least one gradient update based on local data and a local copy of a machine learning model associated with the federated learning procedure. The apparatus may transmit, in the at least one of the federated learning procedure, for a network node, an indication of the at least one gradient update based on a sign of the at least one gradient update and a non-coherent orthogonal modulation scheme.

In an aspect of the disclosure, a method, a computer-readable medium, and an apparatus are provided. The apparatus may be a network node. The apparatus may receive, in at least one round of a federated learning procedure, at least one first superimposed symbol associated with at least one gradient update via at least one first resource and at least one second superimposed symbol associated with the at least one gradient update via at least one second resource from a plurality of UEs including a first UE. The at least one first resource and the at least one second resource may be included in at least one pair of resources associated with a non-coherent orthogonal modulation scheme. The apparatus may identify, in the at least one round of the federated learning procedure, an accumulated sign of the at least one gradient update based on a first received power associated with the at least one first resource and a second received power associated with the at least one second resource. The apparatus may update, in the at least one round of the federated learning procedure, a machine learning model associated with the federated learning procedure based on the accumulated sign of the at least one gradient update.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
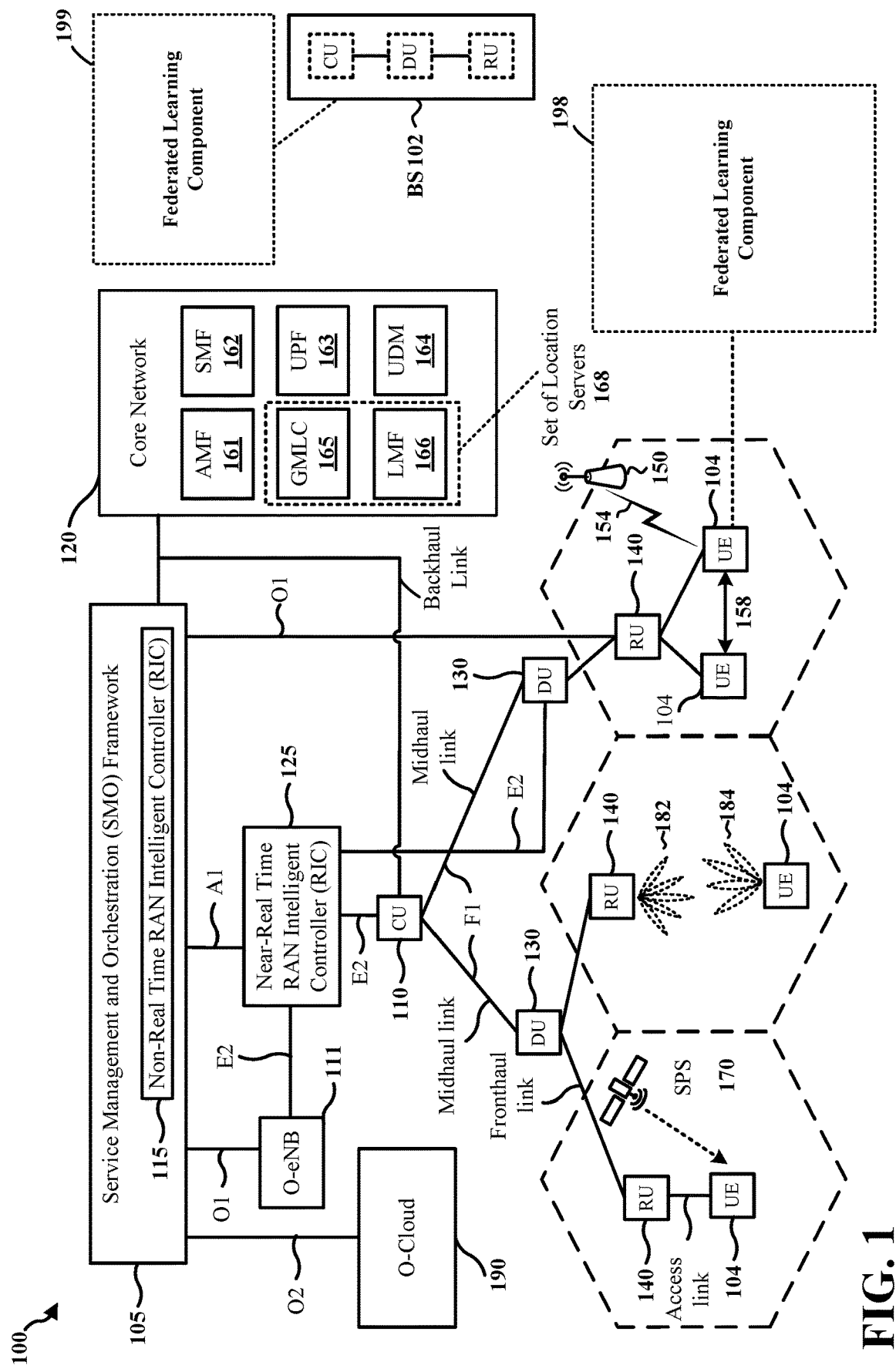
FIG. 1 is a diagram illustrating an example of a wireless communications system and an access network.

In federated learning, a group of UEs may cooperate to train a global machine learning (ML) model without sharing local datasets of the UEs. In particular, each UE may collect its own private dataset. Then, the UEs may cooperate to minimize a global loss function for the global ML model at the parameter server (which may be a network entity, such as a base station, a component of a base station, connected to multiple base stations, a component of a core network, etc., and which may also be referred to as an edge server). At each iteration/round of dataset sharing (referred to interchangeably as a federated learning round, a communication round, or a feedback round), the parameter server may broadcast a global training parameter vector (e.g., including weights for the parameters of the global ML model) to the UEs participating in the iteration/round. Each participating UE may estimate one or more gradients (corresponding to the parameters of the ML model) (also referred to as gradient updates) that may minimize the loss function on a batch of data in the local dataset of the UE. In some configurations, each participating UE may then process the local gradients. Thereafter, each participating UE may share the local gradients (e.g., a processed version) with the parameter server. Upon receiving the local gradients, the parameter server may combine the local gradients to obtain the global (combined) gradient set. Further, the parameter server may update the global training parameter vector using the estimated global gradient set. If the global ML model does not converge (e.g., if there is any non-zero or non-negligible update to the global training parameter vector), for the next iteration/round, the parameter server may broadcast the updated global training parameter vector to the UEs participating in the next iteration/round. Further operations for the next iteration/round may be similar to those described above for the immediately previous iteration/round. One or more iterations/rounds may be performed for the federated learning procedure until the global ML model converges.

One of the key challenges of analog over-the-air federated learning may be that the analog over-the-air federated learning may specify channel pre-compensation at the UE (e.g., for coherent combining), which may impose two main challenges. First, channel pre-compensation at the UE may specify the availability of the channel state information (CSI) at the UE. However, the CSI may not typically be available at the UE (e.g., in a 3GPP system). Second, channel pre-compensation at the UE may use additional transmit (Tx) power at the UE, while the UE may typically have limited Tx power.

In some examples, a UE may identify, in at least one round of a federated learning procedure, at least one gradient update based on local data and a local copy of a machine learning model associated with the federated learning procedure. The UE may transmit, in the at least one round of the federated learning procedure, for a network node, an indication of the at least one gradient update based on a sign of the at least one gradient update and a non-coherent orthogonal modulation scheme. Accordingly, the network node may receive, in at least one round of a federated learning procedure, at least one first superimposed symbol associated with at least one gradient update via at least one first resource and at least one second superimposed symbol associated with the at least one gradient update via at least one second resource from a plurality of UEs including a first UE. The at least one first resource and the at least one second resource may be included in at least one pair of resources associated with a non-coherent orthogonal modulation scheme. The network node may identify, in the at least one round of the federated learning procedure, an accumulated sign of the at least one gradient update based on a first received power associated with the at least one first resource and a second received power associated with the at least one second resource. The network node may update, in the at least one round of the federated learning procedure, a machine learning model associated with the federated learning procedure based on the accumulated sign of the at least one gradient update. Accordingly, the UEs may transmit indications of the gradient updates to the network node without having the full CSI and without performing channel pre-compensation.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHZ-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHZ-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, cNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a federated learning component 198 that may be configured to identify, in at least one round of a federated learning procedure, at least one gradient update based on local data and a local copy of a machine learning model associated with the federated learning procedure. The federated learning component 198 may be configured to transmit, in the at least one round of the federated learning procedure, for a network node, an indication of the at least one gradient update based on a sign of the at least one gradient update and a non-coherent orthogonal modulation scheme. In certain aspects, the base station 102 may have a federated learning component 199 that may be configured to receive, in at least one round of a federated learning procedure, at least one first superimposed symbol associated with at least one gradient update via at least one first resource and at least one second superimposed symbol associated with the at least one gradient update via at least one second resource from a plurality of UEs including a first UE. The at least one first resource and the at least one second resource may be included in at least one pair of resources associated with a non-coherent orthogonal modulation scheme. The federated learning component 199 may be configured to identify, in the at least one round of the federated learning procedure, an accumulated sign of the at least one gradient update based on a first received power associated with the at least one first resource and a second received power associated with the at least one second resource. The federated learning component 199 may be configured to update, in the at least one round of the federated learning procedure, a machine learning model associated with the federated learning procedure based on the accumulated sign of the at least one gradient update.

Figure 2:
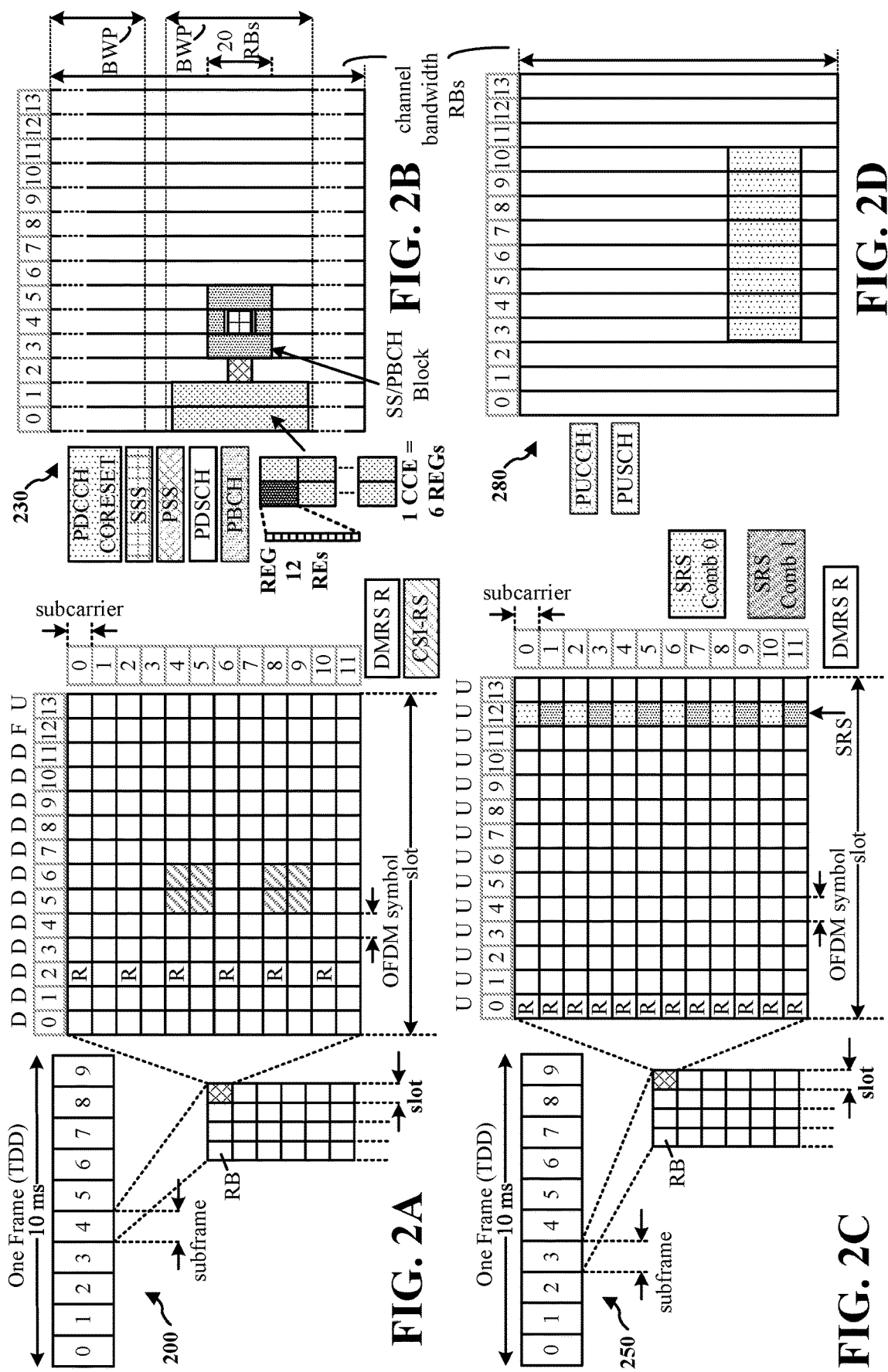
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB)

(also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
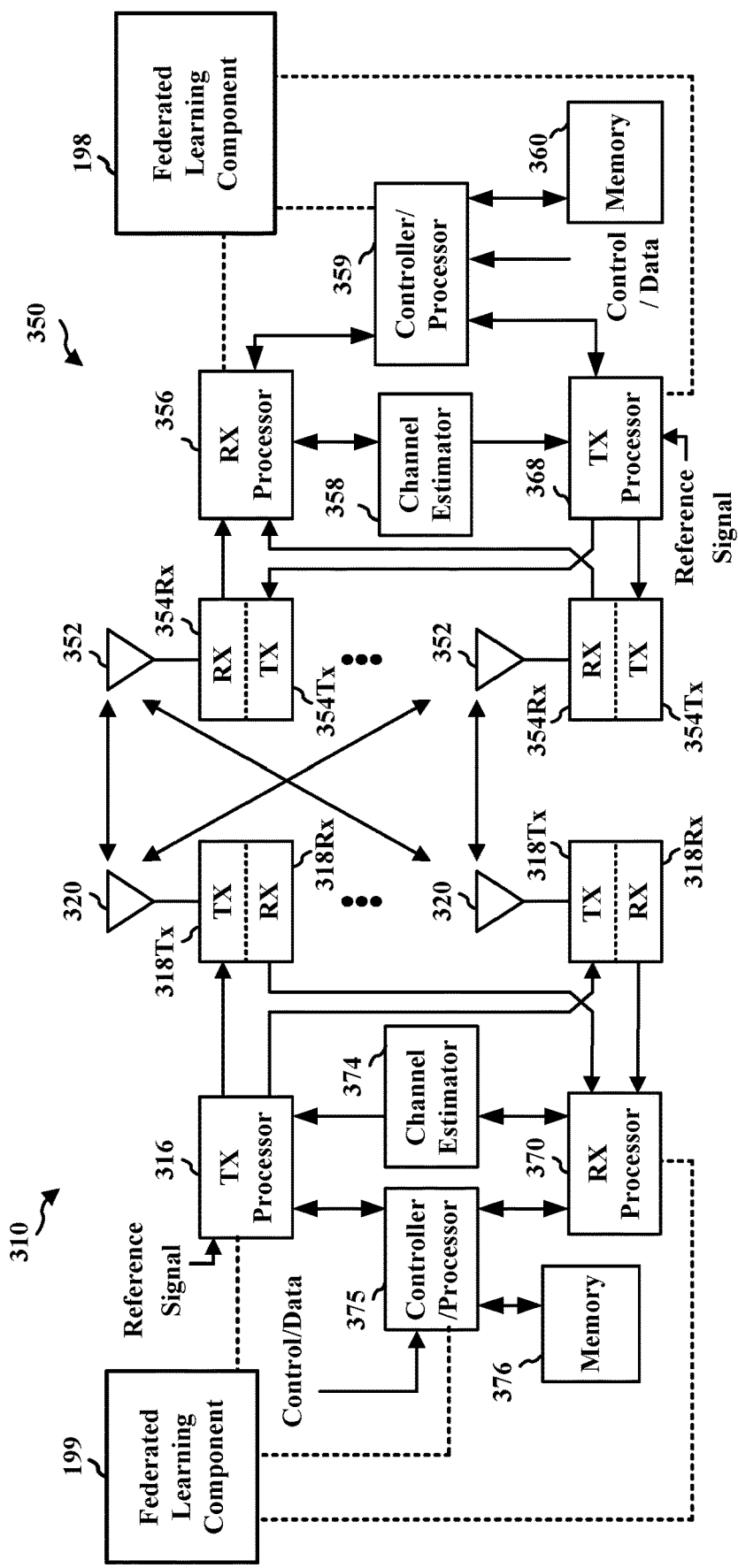
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions, Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the federated learning component 198 of FIG. 1.

At least one of the TX processor 316, the RX processor 370, and the controller/processor 375 may be configured to perform aspects in connection with the federated learning component 199 of FIG. 1.

In federated learning, a group of UEs may cooperate to train a global ML model without sharing local datasets of the UEs. In particular, each UE may collect its own private dataset. Then, all UEs may cooperate to minimize a global loss function at the parameter server (which may be a network entity, such as a base station, etc., or a component of a network entity, and may be referred to interchangeably as an edge server). At each iteration/round, the parameter server may broadcast a global training parameter vector to all UEs. Each UE may estimate at least one gradient that may minimize the loss function on a batch of data in the local dataset of the UE. Each UE may then process the local gradient, and may share a processed version of the local gradient with the parameter server.

In some configurations, analog federated learning may be utilized. In particular, for the analog federated learning, the gradients at each UE may be rescaled to satisfy the power constraint and to mitigate the effect of channel noise. Further, the aggregation may be performed OTA. In some configurations, digital federated learning may be utilized. In particular, for the digital federated learning, the gradients from each UE may be compressed, and may be transmitted to the parameter server using a multiple-access scheme. Further, the parameter server may then aggregate the gradients.

In some configurations, the parameter server may combine the received local gradients to obtain the global (combined) gradient set. Then, the parameter server may update the global training parameter vector using the estimated global gradient set. Thereafter, the parameter serve may provide the updated global training parameter vector to the UEs for the next federated learning iteration/round.

The federated learning technique may be associated with a number of benefits. The privacy of the local data at the UE may be protected because for federated learning, just the local gradients may be shared with the parameter server and the sharing of the local data of each UE may be avoided. Further, central ML model training may be inefficient in terms of storage and/or computation, whereas the federated learning technique may provide natural parallelization for the model training process.

Figure 4:
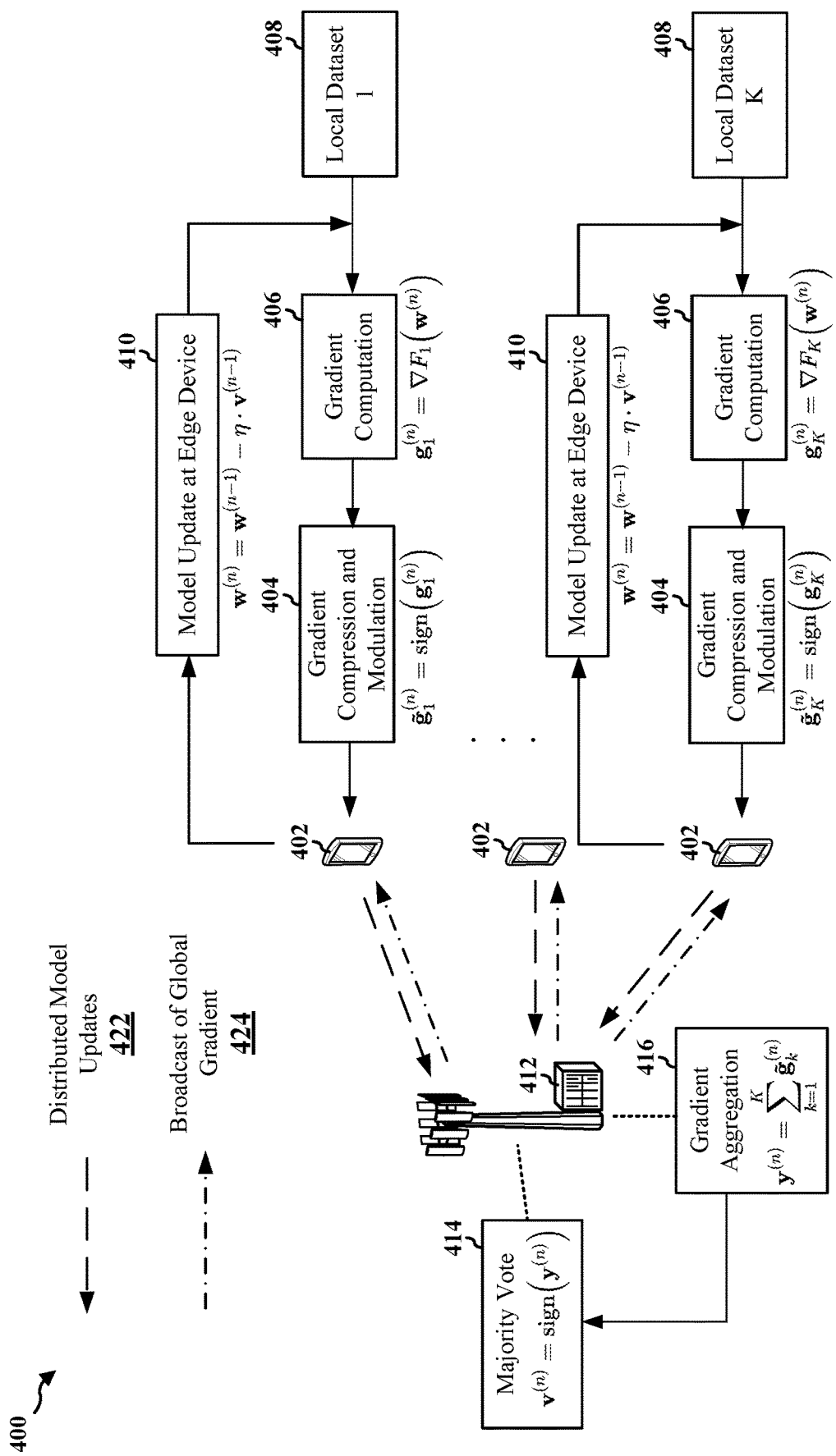
FIG. 4 is a diagram of an example environment associated with federated learning according to one or more aspects.

FIG. 4 is a diagram of an example environment 400 associated with federated learning according to one or more aspects. The parameter server 412 (also referred to as an edge server) may correspond to the base station 102/180/310. The edge device 402 may correspond to the UE 104/350. Federated learning is a technique that may enable users (e.g., UEs or edge devices) to train a ML model (e.g., a neural network) in a collaborative and distributed fashion using users' local datasets at edge devices (e.g., UEs). Specifically, in each round, the parameter server 412 (e.g., an edge parameter server, such as a base station) may select a number of edge devices 402, and may transmit 424 a copy of the global ML model (e.g., the copy may include the parameters (weights) or a gradient set of the global ML model) to each of the selected edge devices 402. Then, at 406, each edge device 402 may compute updated local model parameters or gradients (or gradient set elements) of the ML model based on a local copy of the ML model (which may be referred to as the local ML model hereinafter) that is updated, at 410, with the local dataset 408 at the edge device 402. At 404, each edge device 402 may compress and/or modulate the computed local gradients (or gradient set elements) in preparation for transmission. Next, each edge device 402 may feedback, at 422, the corresponding update including the updated local model parameters or the local gradient set elements to the parameter server 412. Thereafter, the parameter server 412 may aggregate, at 416, all the updates 422 from the edge devices 402, and may update, at 414, the global ML model based on the aggregated updates and a majority vote. For the next iteration/round, the parameter server 412 may transmit a copy of the updated global machine model (e.g., parameters (weights) or a global gradient set) to selected edge devices 402, and the edge devices 402 may perform again similar operations as described above. The process may be repeated for a number of times corresponding to a number of iterations/rounds until the global ML model converges (e.g., until the global model update may no longer produce any non-negligible changes to the global ML model).

Federated learning may be associated with the advantage of keeping user data 408 private at edge devices 402 based on the distributed optimization framework (i.e., the user data itself may not be transmitted to the parameter server 412).

One of the key challenges of analog OTA federated learning may be that the analog OTA federated learning may specify channel pre-compensation at the UE (e.g., for coherent combining), which may impose two main challenges. First, channel pre-compensation at the UE may specify the availability of the CSI at the UE. However, the CSI may not typically be available at the UE (e.g., in a 3GPP system). Second, channel pre-compensation at the UE may use additional Tx power at the UE, while the UE may typically have limited Tx power.

In one or more aspects, to address the channel pre-compensation challenges in the OTA gradient accumulation in the federated learning, as described above, a non-coherent combining scheme may be utilized. In some configurations, for the non-coherent combining scheme, no CSI may be involved at the UE. In some other configurations, for the non-coherent combining scheme, just limited CSI (e.g., the long term average channel gain) may be used at the UE.

In one or more configurations, the federated learning, in particular, the gradient update and aggregation, may be performed using a "signSGD" approach. For the federated learning, in communication round n, the k-th UE may calculate the gradient, $g_k^{(n)}$, based on a subset of the local dataset of the k-th UE, and may send the gradient to the network (e.g., the parameter server). For the OTA federated learning, multiple UEs may share the same resources for transmitting their gradients. In particular, each UE may transmit $$\frac{g_k^{(n)}}{h_k^{(n)}},$$

where $h_k^{(n)}$ may be the channel coefficient of the resource (i.e., channel pre-compensation). Of course, there may be different schemes for the channel pre-compensation at the UE (e.g., zero forcing, minimum mean square error (MMSE), etc.).

In one or more configurations, the received signal at the parameter server at the n-th communication round may be given as follows:

$$r^{(n)} = \sum_{k=1}^{K} h_k^{(n)} \frac{g_k^{(n)}}{h_k^{(n)}} = \sum_{k=1}^{K} g_k^{(n)}.$$

For the OTA federated learning, gradient combining may be performed OTA utilizing the superposition property of the wireless channel. Due to the channel pre-compensation, the gradients may be coherently combined. The network (e.g., the parameter server) may be interested just in the sum of the local gradients. Hence, there may be no need to resolve the interference between the gradients transmitted by the different UEs. In fact, the interference may be utilized to accumulate the gradients.

In one or more configurations, instead of sending the actual gradients, the UEs may implement the "signSGD" approach. In particular, with the "signSGD" approach, a UE may send just the sign of the gradient instead of the actual gradient. The "signSGD" approach may be associated with efficient compression of the gradient transmission. Accordingly, use of the "signSGD" approach may lead to reduction of transmission overhead while maintaining a high convergence rate.

Accordingly, in one or more configurations, the gradient combining for the federated learning may be performed in a non-coherent fashion. In particular, all UEs may simultaneously transmit the signs of respective gradients using a non-coherent orthogonal modulation scheme using two resources: $l^+$ and $l^-$. The transmitted symbols $t_{k,l^+}$ and $t_{k,l^-}$ may be given as follows:

$$t_{k,l^+} = \begin{cases} \sqrt{p_k} \times s_{k,i}^{(n)}, & \text{when } g_{k,i}^{(n)} \geq 0 \\ 0, & \text{when } g_{k,i}^{(n)} < 0 \end{cases},$$

$$t_{k,l^-} = \begin{cases} 0, & \text{when } g_{k,i}^{(n)} \geq 0 \\ \sqrt{p_k} \times s_{k,i}^{(n)}, & \text{when } g_{k,i}^{(n)} < 0 \end{cases},$$

where $s_{k,i}^{(n)}$ may be a (pseudo-)random symbol on a unit circle, and may be independent (different) across resources and UEs, $p_k$ may be the power of the transmitted symbol, i may represent the gradient index, and l may represent the time-frequency resource index.

Accordingly, at the network (e.g., the parameter server), the received superimposed (superposed) compressed gradients on the pair of resources may be given as follows:

$$r_{l^+}^{(n)} = \sum_{\forall k} \sqrt{p_k} \, h_{k,l^+}^{(n)} s_{k,i}^{(n)} + n_{l^+}^{(n)},$$

$$r_{I^-}^{(n)} = \sum_{\forall k} \sqrt{p_k}\, h_{k,I^-}^{(n)} s_{k,i}^{(n)} + n_{I^-}^{(n)}.$$

In some configurations, the channel phase may be random. Further, it may be assumed that the UEs may not have the channel phase information to perform channel pre-compensation.

In one or more configurations, the received power on both resources $I^+$ and $I^-$ may be accumulated. The average power of the received signals on the two resources may be given as follows:

$$E[r_{I^+}^{(n)} r_{I^+}^{(n)*}] = \sum_{\forall k_e \in K^{+(n)}} p_k + \sigma^2,$$

$$E[r_{I^-}^{(n)} r_{I^-}^{(n)*}] = \sum_{\forall k_e \in K^{-(n)}} p_k + \sigma^2$$

where $K^{+(n)}$ and $K^{-(n)}$ may be the set (list) of UEs voting for positive and negative gradients, respectively, in the n-th communication round, and $\sigma^2$ may be the noise power. The small scale fading channel coefficients $h_{k,I^+}^{(n)}$ and $h_{k,I^-}^{(n)}$ may be averaged out, since $$E\{|h_{k,I^+}^{(n)}|^2\} = E\{|h_{k,I^-}^{(n)}|^2\} = 1.$$

In one or more configurations, the network (e.g., the parameter server) may use an energy detector to detect the majority vote for the i-th gradient as follows: If $E[r_{I^+}^{(n)} r_{I^+}^{(n)*}] > E[r_{I^-}^{(n)} r_{I^-}^{(n)*}]$, then the majority vote may have a positive sign. Otherwise, the majority vote may have a negative sign. In other words, $$v_i^{(n)} = \text{sign}(|r_{I^+}^{(n)}|_2^2 - |r_{I^-}^{(n)}|_2^2),$$

where $v_i^{(n)}$ may be the majority vote sign for the n-th communication round.

In one or more configurations, the same gradient may be transmitted over multiple resources to achieve sufficient channel averaging. The majority vote may then be given as follows:

$$v_i^{(n)} = \text{sign}(|r_{I^+}^{(n)}|_2^2 - |r_{I^-}^{(n)}|_2^2).$$

Next, the majority vote may be used to update the global training parameters. Thereafter, the parameter server may share the updated global training parameters (e.g., weights) with the UEs.

In one or more configurations, the network (e.g., the parameter server) may be configured to enable the non-coherent combining of the local gradients without channel pre-compensation. To that end, the network may configure UEs participating in the federated learning (training) to send the local gradient updates (which may be referred to simply as gradients) using a non-coherent orthogonal modulation scheme. An example non-coherent orthogonal modulation schemes have been described in detail above. In particular, the network may configure the UEs to transmit indications of the signs of the local gradients using the "signSGD" approach, instead of sending the actual gradients. In one or more configurations, the network may configure the UEs with the non-coherent orthogonal modulation scheme via one or more of an RRC message, a MAC-control element (MAC-CE), a system information (SI) message, or a DCI message.

Figure 5:
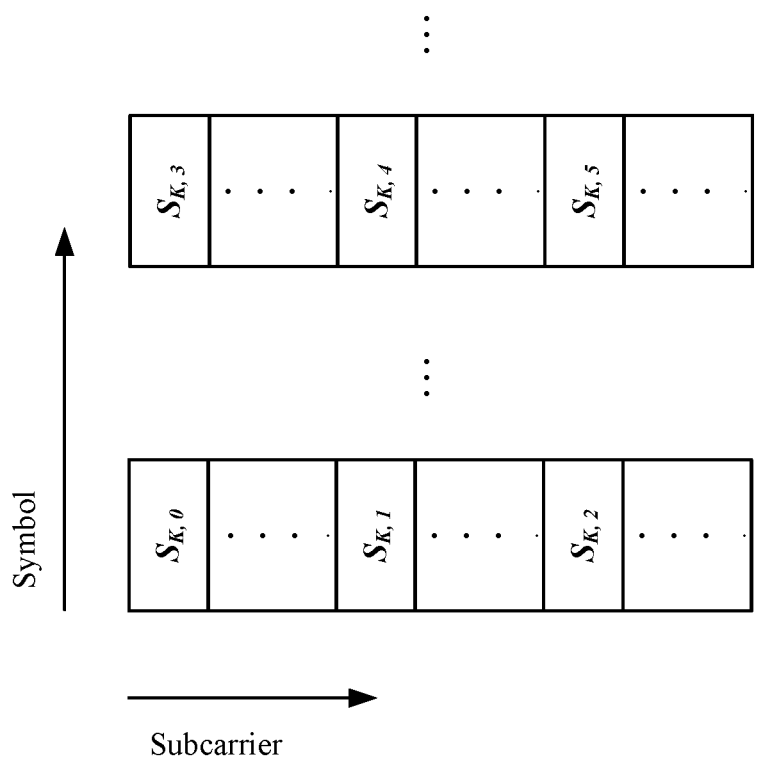
FIG. 5 is a diagram illustrating an example resource configuration for non-coherent combining.

FIG. 5 is a diagram 500 illustrating an example resource configuration for non-coherent combining. In one or more configurations, the network (e.g., the parameter server) may configure the resources that the UEs may use to transmit gradient updates using the non-coherent orthogonal modulation scheme. As shown in FIG. 5, the resource configuration for the non-coherent orthogonal modulation scheme may include one or more of a time (e.g., slots, symbols) configuration, a frequency (e.g., RBs, REs in an RB) configuration, and/or a beam (e.g., a quasi co-location (QCL) relationship) configuration.

Unlike for pulse-amplitude modulation (PAM) or quadrature amplitude modulation (QAM), for the non-coherent orthogonal modulation scheme, the network (e.g., the parameter server) may configure a pair of resources (e.g., $I^+$ and $I^-$) for the gradient transmissions from the UEs. The network may then compare the received signals (e.g., received power) on the pair of resources to decode the majority vote of all participating UEs. In one or more further configurations, the network may configure multiple resources for the same gradient transmission (i.e., multiple resources for indications of positive/non-negative gradients and/or multiple resources for indications of negative/non-positive gradients) to achieve sufficient channel averaging.

In one or more configurations, the network (e.g., the parameter server) may configure the resources for the gradient transmissions from UEs taking into consideration fairness between the pair of resources associated with the non-coherent orthogonal modulation scheme. As described above, each symbol in the non-coherent orthogonal modulation scheme may be transmitted by one or more UEs using a pair of resources. It may be desired to achieve fairness between the received power in the pair of resources associated with the non-coherent orthogonal modulation scheme. In one or more configurations, for each UE, the pair of resources may be configured with the same QCL properties to achieve fairness between the received power levels on these resources. That is, the UE may not receive different QCL properties or different power configurations for the pair of resources associated with the non-coherent orthogonal modulation scheme. In one or more configurations, the pair of resources associated with the non-coherent orthogonal modulation scheme may be configured on the same component carrier (CC) and/or the same BWP to achieve fair comparison between the received power levels in the pair of resources. For example, the $I^+$ and $I^-$ resources may be on different REs on the same RB, or may be adjacent (or nearby) symbols. In general, the pair of resources associated with the non-coherent orthogonal modulation scheme may be located on nearby REs on the time-frequency grid so that the pair of resources may be associated with similar channel properties.

In one or more configurations, the network (e.g., the parameter server) may configure the resource mapping (e.g., parameters associated with resource mapping) in the non-coherent modulation scheme. Each UE participating in the federated learning may send one or more gradients (or a compressed version of the gradients, e.g., using the "signSGD" approach) to the network. A mapping may be defined between the gradients and the resources. For example, the mapping may start with gradients of the inner (or outer) layers of the neural network, and then may move to the outer (or inner) layers. In such an order, the gradients may be mapped one by one to the resources in the time frequency grid. As such, the gradients may be mapped to the configured resources. For another example, for each gradient, the mapping may start with the 1⁺ (or 1⁻) resource first, and then may be followed by the 1⁻ (or 1⁺) resource. In some configurations, 1⁺ may be mapped to the even-indexed resources and 1⁻ may be mapped to the odd-indexed resources. In some other configurations, 1⁺ may be mapped to the odd-indexed resources and 1⁻ may be mapped to the even-indexed resources. In one or more configurations, the network (e.g., the parameter server) may adjust/change the resource mapping configuration (e.g., resource mapping parameters) using one or more of an RRC message, a MAC-CE, an SI message, or a DCI message.

In one or more configurations, the network (e.g., the parameter server) may provide a power control configuration to UEs participating in the federated learning. Based on the power control configuration, the UEs may perform power control based on the pathloss (e.g., based on just the pathloss) associated with the wireless channel between the respective UE and the network (e.g., the parameter server). Typically, the UE may not know the instantaneous uplink beamformed channel (small-scale fading) based on which channel pre-compensation may be performed. However, the UE may know some large-scale fading information about the channel (e.g., the pathloss). Accordingly, based on the power control configuration, the UE may perform power control based on just the pathloss. In particular, the UE may increase the Tx power as the pathloss of the channel increases.

In some configurations, a power control entity for the PUSCH and the SRS and another power control entity for the PUCCH may be provided. In both power control entities, the UE may be configured to perform full or partial pathloss compensation (e.g., to reduce the interference at neighboring cells).

In one or more configurations, a separate power control entity for the gradient transmission associated with the federate learning may be provided. Based on the use of the separate power control entity, the UE may perform just the full pathloss compensation (not partial pathloss compensation), so that the federated learning algorithm may function properly.

In one or more configurations, based on a network-provided configuration, the UEs may switch between the non-coherent modulation scheme and the OTA coherent aggregation scheme (or another federated learning-related transmission scheme) for the federated learning. In particular, the network (e.g., the parameter server) may configure the UEs to switch between the non-coherent orthogonal modulation with the "signSGD" approach and the coherent OTA channel aggregation with channel pre-compensation. As described above, one advantage of the non-coherent orthogonal modulation scheme may be that the non-coherent orthogonal modulation may not involve channel pre-compensation. However, the coherent OTA aggregation may have a faster federated learning convergence time/rate since the UEs may transmit the full gradients instead of just the signs of the gradients. Therefore, it may be desirable to use the coherent OTA aggregation in some scenarios. Accordingly, in one or more configurations, the network (e.g., the parameter server) may configure the UEs, such that the UEs may switch between the non-coherent modulation scheme and the coherent aggregation schemes for the federated learning according to the information available at the UE as well as the training convergence specification.

Figure 6:
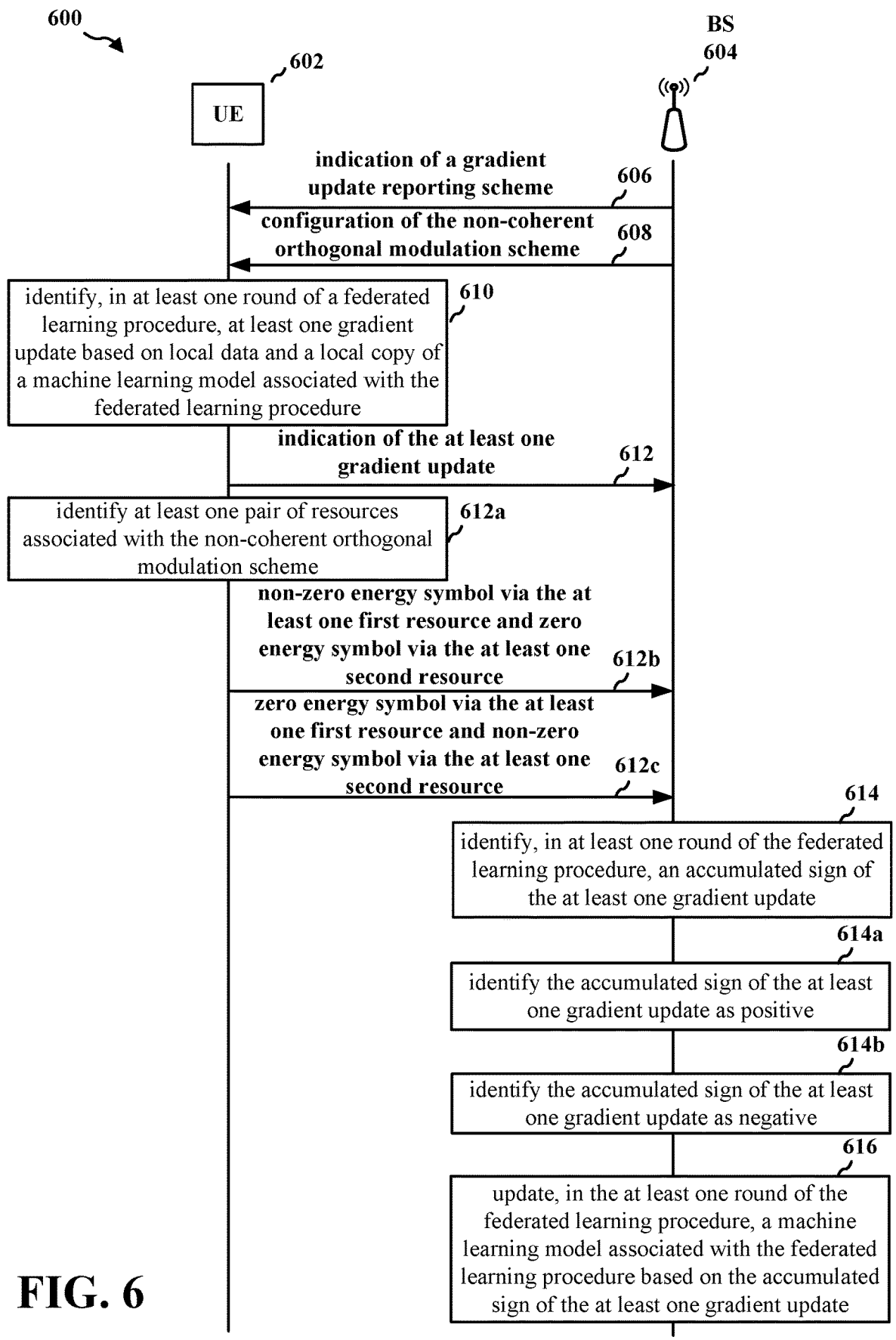
FIG. 6 is a diagram of a communication flow of a method of wireless communication.

FIG. 6 is a diagram of a communication flow 600 of a method of wireless communication. The (first) UE 602 may implement aspects of the UE 104/350 or the UE/edge device 402. The network node 604 may implement aspects of the base station 102/310 or the parameter/edge server 412. In one configuration, at 606, the network node 604 may transmit, for the (first) UE 602, an indication of a gradient update reporting scheme. The gradient update reporting scheme may be selected between the non-coherent orthogonal modulation scheme or a coherent OTA channel aggregation scheme.

In one configuration, at 608, the network node 604 may transmit, for the (first) UE 602, a configuration of the non-coherent orthogonal modulation scheme via at least one of an RRC message, a MAC-CE, an SI message, or a DCI message. The configuration of the non-coherent orthogonal modulation scheme may include a time configuration associated with the at least one pair of resources, a frequency configuration associated with the at least one pair of resources, or a beam configuration associated with the at least one pair of resources.

In one configuration, the configuration of the non-coherent orthogonal modulation scheme may further include an indication of pathloss-based power control for the non-coherent orthogonal modulation scheme.

At 610, the (first) UE 602 may identify, in at least one round (e.g., each round) of a federated learning procedure, at least one gradient update based on local data (at the UE) and a local copy of a machine learning model associated with the federated learning procedure.

At 612, the (first) UE 602 may transmit, in the at least one round of the federated learning procedure, for the network node 604, an indication of the at least one gradient update based on a sign of the at least one gradient update and a non-coherent orthogonal modulation scheme.

To transmit, at 612, in the at least one round of the federated learning procedure, for the network node 604, the indication of the at least one gradient update, at 612a, the (first) UE 602 may identify at least one pair of resources associated with the non-coherent orthogonal modulation scheme. The at least one pair of resources may include at least one first resource and at least one second resource.

In one configuration, the at least one first resource and the at least one second resource may be associated with one or more of a same QCL property, a same CC, or a same BWP.

At 612b, the (first) UE 602 may transmit, for the network node 604, a non-zero energy symbol via the at least one first resource and a zero energy symbol via the at least one second resource if the sign of the at least one gradient update is non-negative (or positive).

At 612c, the (first) UE 602 may transmit, for the network node 604, the zero energy symbol via the at least one first resource and the non-zero energy symbol via the at least one second resource if the sign of the at least one gradient update is negative (or non-positive). In some configurations, the (first) UE 602 may transmit the zero energy symbol via both the at least one first resource and the at least one second resource if the at least one gradient update is zero.

In one configuration, the non-zero energy symbol may include a pseudorandom symbol.

In one configuration, the at least one gradient update may include a plurality of gradient updates. The at least one pair of resources may include a plurality of pairs of resources. Each gradient update in the plurality of gradient updates may be associated with a respective pair of resources in the plurality of pairs of resources.

Further, at 612, additional UEs (not shown), like the (first) UE 602, may transmit respective indications of the respective gradient updates to the network node 604 based on the same non-coherent orthogonal modulation scheme as used by the (first) UE 602. Accordingly, at 612, the network node 604 may receive, in at least one round (e.g., each round) of a federated learning procedure, at least one first superimposed (superposed) symbol associated with the at least one gradient update via the at least one first resource and at least one second superimposed (superposed) symbol associated with the at least one gradient update via the at least one second resource from a plurality of UEs including the (first) UE 602.

At 614, the network node 604 may identify, in the at least one round of the federated learning procedure, an accumulated sign of the at least one gradient update based on a first received power associated with the at least one first resource and a second received power associated with the at least one second resource.

To identify, at 614, in the at least one round of the federated learning procedure, the accumulated sign of the at least one gradient update, at 614a, the network node 604 may identify the accumulated sign of the at least one gradient update as positive if the first received power associated with the at least one first resource is greater than the second received power associated with the at least one second resource.

Alternatively, at 614b, the network node 604 may identify the accumulated sign of the at least one gradient update as negative if the first received power associated with the at least one first resource is less than the second received power associated with the at least one second resource.

At 616, the network node 604 may update, in the at least one round of the federated learning procedure, a (global) machine learning model associated with the federated learning procedure based on the accumulated sign of the at least one gradient update.

Figure 7:
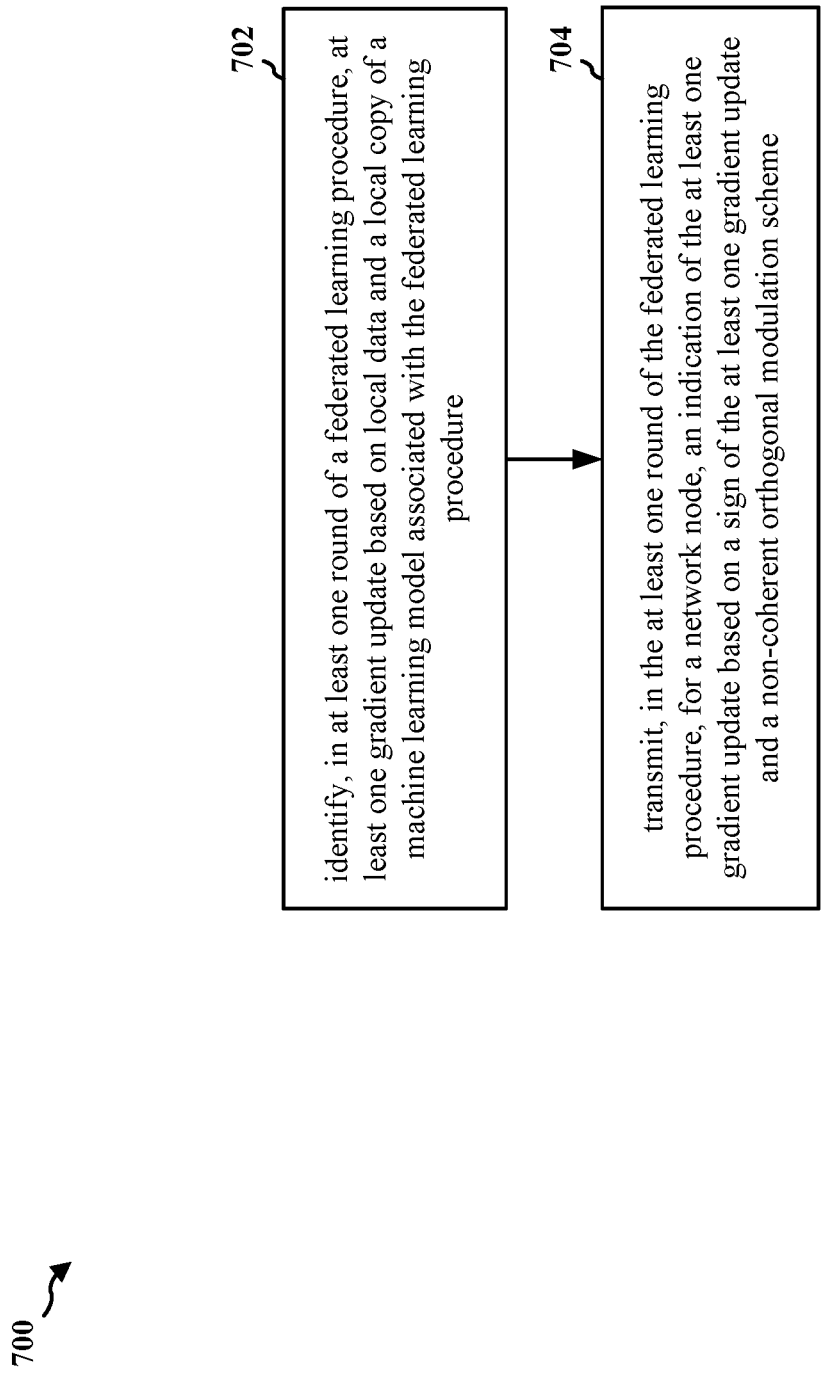
FIG. 7 is a flowchart of a method of wireless communication.

FIG. 7 is a flowchart 700 of a method of wireless communication. The method may be performed by a UE (e.g., the UE 104/350/602; the UE/edge device 402; the apparatus 1104). At 702, the UE may identify, in at least one round of a federated learning procedure, at least one gradient update based on local data and a local copy of a machine learning model associated with the federated learning procedure. For example, 702 may be performed by the component 198 in FIG. 11. Referring to FIG. 6, at 610, the UE 602 may identify, in at least one round of a federated learning procedure, at least one gradient update based on local data and a local copy of a machine learning model associated with the federated learning procedure.

At 704, the UE may transmit, in the at least one round of the federated learning procedure, for a network node, an indication of the at least one gradient update based on a sign of the at least one gradient update and a non-coherent orthogonal modulation scheme. For example, 704 may be performed by the component 198 in FIG. 11. Referring to FIG. 6, at 612, the UE 602 may transmit, in the at least one round of the federated learning procedure, for a network node 604, an indication of the at least one gradient update based on a sign of the at least one gradient update and a non-coherent orthogonal modulation scheme.

Figure 8:
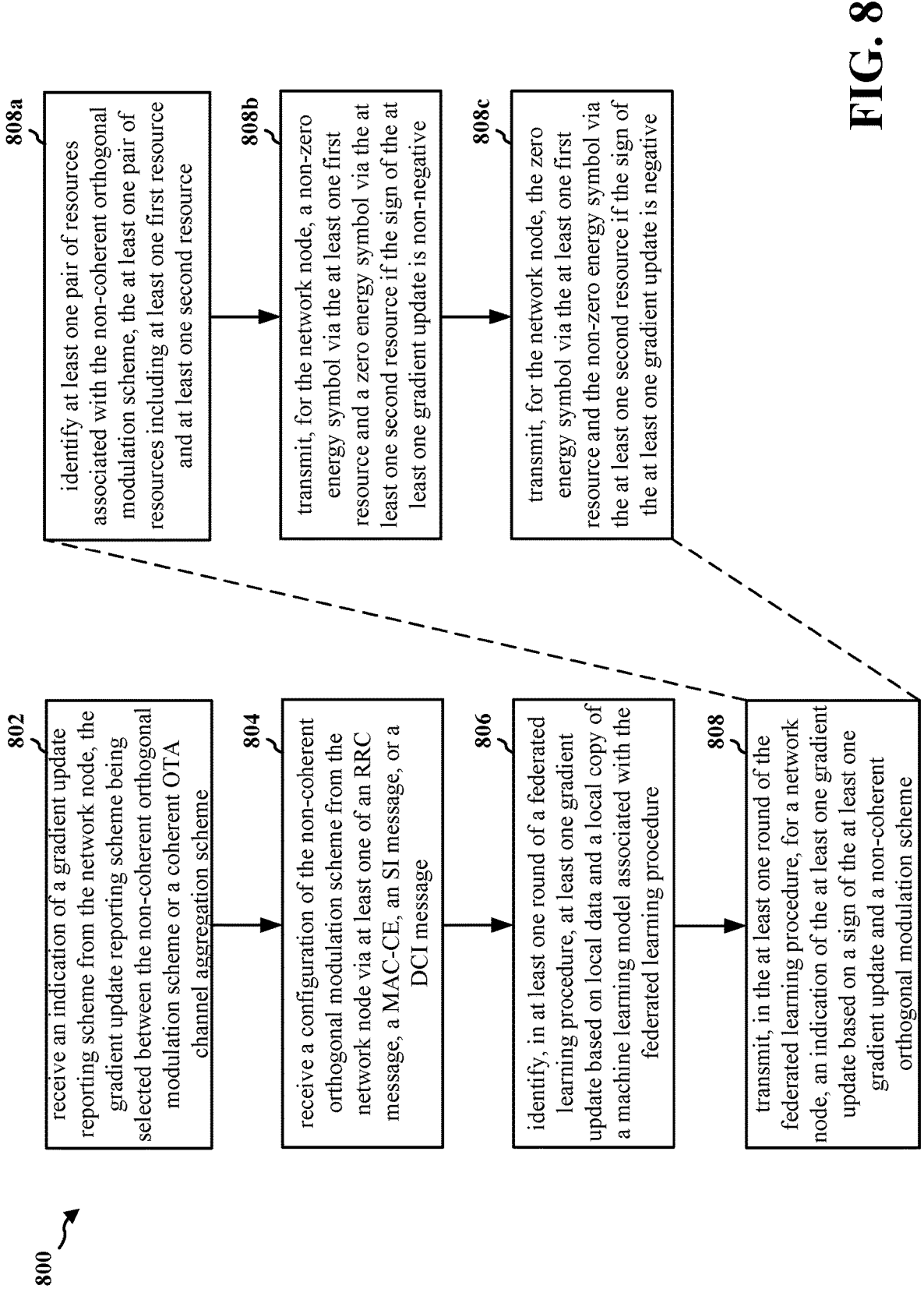
FIG. 8 is a flowchart of a method of wireless communication.

FIG. 8 is a flowchart 800 of a method of wireless communication. The method may be performed by a UE (e.g., the UE 104/350/602; the UE/edge device 402; the apparatus 1104). At 806, the UE may identify, in at least one round of a federated learning procedure, at least one gradient update based on local data and a local copy of a machine learning model associated with the federated learning procedure. For example, 806 may be performed by the component 198 in FIG. 11. Referring to FIG. 6, at 610, the UE 602 may identify, in at least one round of a federated learning procedure, at least one gradient update based on local data and a local copy of a machine learning model associated with the federated learning procedure.

At 808, the UE may transmit, in the at least one round of the federated learning procedure, for a network node, an indication of the at least one gradient update based on a sign of the at least one gradient update and a non-coherent orthogonal modulation scheme. For example, 808 may be performed by the component 198 in FIG. 11. Referring to FIG. 6, at 612, the UE 602 may transmit, in the at least one round of the federated learning procedure, for a network node 604, an indication of the at least one gradient update based on a sign of the at least one gradient update and a non-coherent orthogonal modulation scheme.

In one configuration, to transmit, at 808, in the at least one round of the federated learning procedure, for the network node, the indication of the at least one gradient update, at 808a, the UE may identify at least one pair of resources associated with the non-coherent orthogonal modulation scheme. The at least one pair of resources may include at least one first resource and at least one second resource. For example, 808a may be performed by the component 198 in FIG. 11. Referring to FIG. 6, at 612a, the UE 602 may identify at least one pair of resources associated with the non-coherent orthogonal modulation scheme.

At 808b, the UE may transmit, for the network node, a non-zero energy symbol via the at least one first resource and a zero energy symbol via the at least one second resource if the sign of the at least one gradient update is non-negative. For example, 808b may be performed by the component 198 in FIG. 11. Referring to FIG. 6, at 612b, the UE 602 may transmit, for the network node 604, a non-zero energy symbol via the at least one first resource and a zero energy symbol via the at least one second resource if the sign of the at least one gradient update is non-negative.

At 808c, the UE may transmit, for the network node, the zero energy symbol via the at least one first resource and the non-zero energy symbol via the at least one second resource if the sign of the at least one gradient update is negative. For example, 808c may be performed by the component 198 in FIG. 11. Referring to FIG. 6, at 612c, the UE 602 may transmit, for the network node 604, the zero energy symbol via the at least one first resource and the non-zero energy symbol via the at least one second resource if the sign of the at least one gradient update is negative.

In one configuration, the non-zero energy symbol may include a pseudorandom symbol.

In one configuration, at 804, the UE may receive a configuration of the non-coherent orthogonal modulation scheme from the network node via at least one of an RRC message, a MAC-CE, an SI message, or a DCI message. The configuration of the non-coherent orthogonal modulation scheme may include a time configuration associated with the at least one pair of resources, a frequency configuration associated with the at least one pair of resources, or a beam configuration associated with the at least one pair of resources. For example, 804 may be performed by the component 198 in FIG. 11. Referring to FIG. 6, at 608, the UE 602 may receive a configuration of the non-coherent orthogonal modulation scheme from the network node 604 via at least one of an RRC message, a MAC-CE, an SI message, or a DCI message.

In one configuration, the configuration of the non-coherent orthogonal modulation scheme may further include an indication of pathloss-based power control for the non-coherent orthogonal modulation scheme.

In one configuration, the at least one first resource and the at least one second resource may be associated with one or more of a same QCL property, a same CC, or a same BWP.

In one configuration, the at least one gradient update may include a plurality of gradient updates. The at least one pair of resources may include a plurality of pairs of resources. Each gradient update in the plurality of gradient updates may be associated with a respective pair of resources in the plurality of pairs of resources.

In one configuration, at 802, the UE may receive an indication of a gradient update reporting scheme from the network node. The gradient update reporting scheme may be selected between the non-coherent orthogonal modulation scheme or a coherent OTA channel aggregation scheme. For example, 802 may be performed by the component 198 in FIG. 11. Referring to FIG. 6, at 606, the UE 602 may receive an indication of a gradient update reporting scheme from the network node 604.

Figure 9:
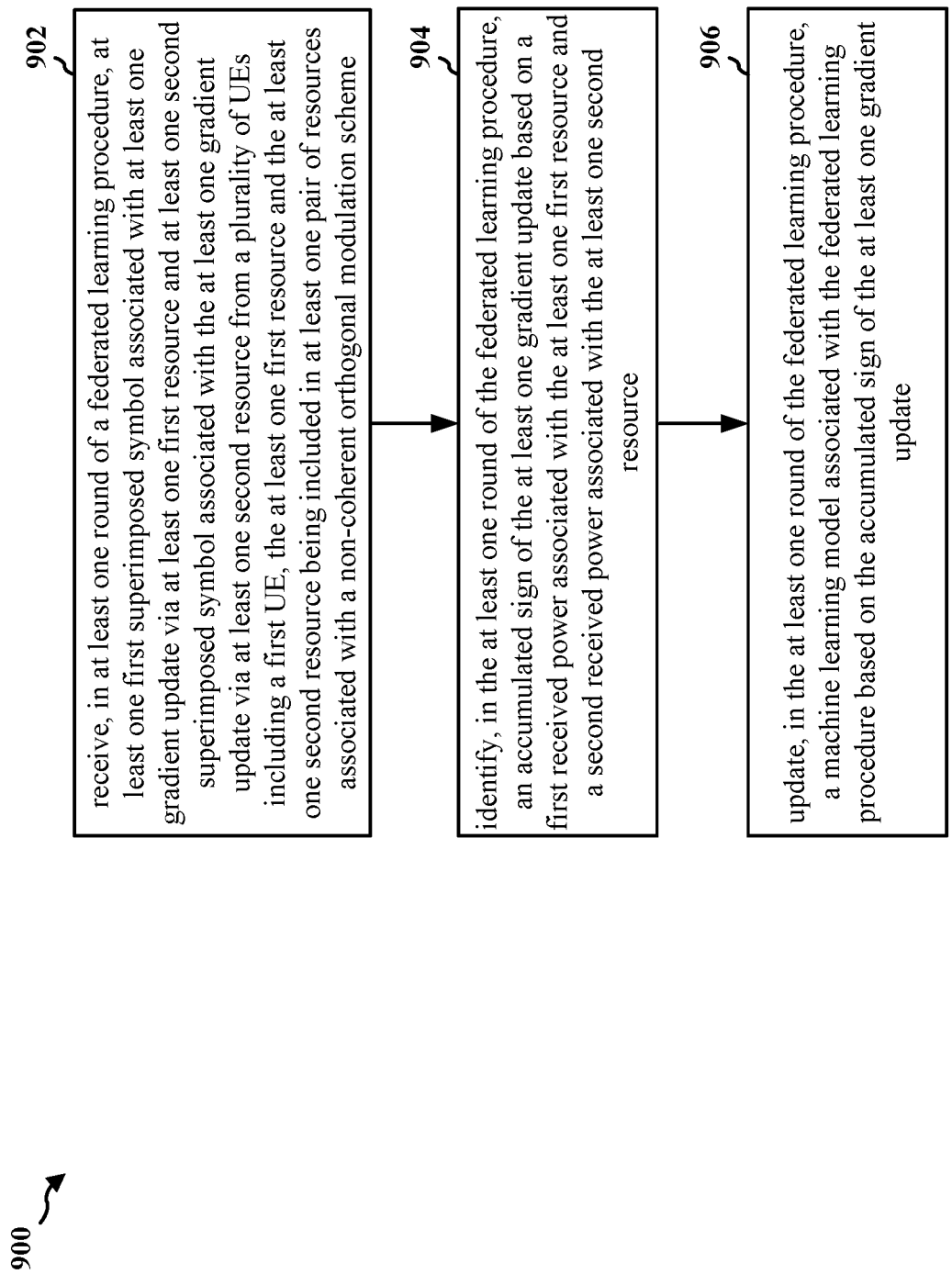
FIG. 9 is a flowchart of a method of wireless communication.

FIG. 9 is a flowchart 900 of a method of wireless communication. The method may be performed by a network node (e.g., the base station 102/310; the parameter/edge server 412; the network node 604; the network entity 1102/1202). At 902, the network node may receive, in at least one round of a federated learning procedure, at least one first superimposed symbol associated with at least one gradient update via at least one first resource and at least one second superimposed symbol associated with the at least one gradient update via at least one second resource from a plurality of UEs including a first UE. The at least one first resource and the at least one second resource may be included in at least one pair of resources associated with a non-coherent orthogonal modulation scheme. For example, 902 may be performed by the component 199 in FIG. 12. Referring to FIG. 6, at 612, the network node 604 may receive, in at least one round of a federated learning procedure, at least one first superimposed symbol associated with at least one gradient update via at least one first resource and at least one second superimposed symbol associated with the at least one gradient update via at least one second resource from a plurality of UEs including a first UE 602.

At 904, the network node may identify, in the at least one round of the federated learning procedure, an accumulated sign of the at least one gradient update based on a first received power associated with the at least one first resource and a second received power associated with the at least one second resource. For example, 904 may be performed by the component 199 in FIG. 12. Referring to FIG. 6, at 614, the network node 604 may identify, in the at least one round of the federated learning procedure, an accumulated sign of the at least one gradient update based on a first received power associated with the at least one first resource and a second received power associated with the at least one second resource.

At 906, the network node may update, in the at least one round of the federated learning procedure, a machine learning model associated with the federated learning procedure based on the accumulated sign of the at least one gradient update. For example, 906 may be performed by the component 199 in FIG. 12. Referring to FIG. 6, at 616, the network node 604 may update, in the at least one round of the federated learning procedure, a machine learning model associated with the federated learning procedure based on the accumulated sign of the at least one gradient update.

Figure 10:
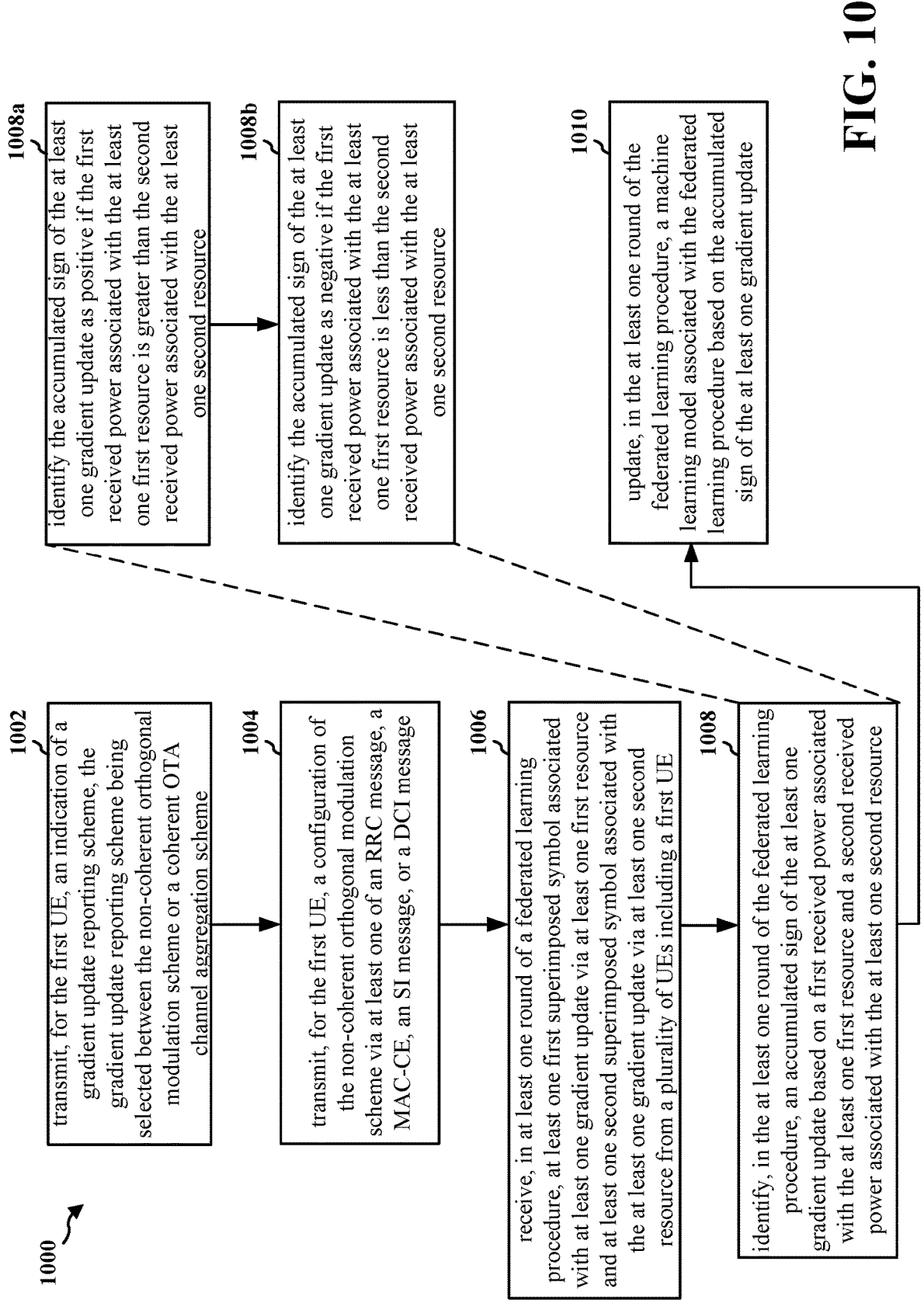
FIG. 10 is a flowchart of a method of wireless communication.

FIG. 10 is a flowchart 1000 of a method of wireless communication. The method may be performed by a network node (e.g., the base station 102/310; the parameter/edge server 412; the network node 604; the network entity 1102/1202). At 1006, the network node may receive, in at least one round of a federated learning procedure, at least one first superimposed symbol associated with at least one gradient update via at least one first resource and at least one second superimposed symbol associated with the at least one gradient update via at least one second resource from a plurality of UEs including a first UE. The at least one first resource and the at least one second resource may be included in at least one pair of resources associated with a non-coherent orthogonal modulation scheme. For example, 1006 may be performed by the component 199 in FIG. 12. Referring to FIG. 6, at 612, the network node 604 may receive, in at least one round of a federated learning procedure, at least one first superimposed symbol associated with at least one gradient update via at least one first resource and at least one second superimposed symbol associated with the at least one gradient update via at least one second resource from a plurality of UEs including a first UE 602.

At 1008, the network node may identify, in the at least one round of the federated learning procedure, an accumulated sign of the at least one gradient update based on a first received power associated with the at least one first resource and a second received power associated with the at least one second resource. For example, 1008 may be performed by the component 199 in FIG. 12. Referring to FIG. 6, at 614, the network node 604 may identify, in the at least one round of the federated learning procedure, an accumulated sign of the at least one gradient update based on a first received power associated with the at least one first resource and a second received power associated with the at least one second resource.

At 1010, the network node may update, in the at least one round of the federated learning procedure, a machine learning model associated with the federated learning procedure based on the accumulated sign of the at least one gradient update. For example, 1010 may be performed by the component 199 in FIG. 12. Referring to FIG. 6, at 616, the network node 604 may update, in the at least one round of the federated learning procedure, a machine learning model associated with the federated learning procedure based on the accumulated sign of the at least one gradient update.

In one configuration, to identify, at 1008, in the at least one round of the federated learning procedure, the accumulated sign of the at least one gradient update, at 1008*a*, the network node may identify the accumulated sign of the at least one gradient update as positive if the first received power associated with the at least one first resource is greater than the second received power associated with the at least one second resource. For example, 1008*a* may be performed by the component 199 in FIG. 12. Referring to FIG. 6, at 614*a*, the network node 604 may identify the accumulated sign of the at least one gradient update as positive if the first received power associated with the at least one first resource is greater than the second received power associated with the at least one second resource.

At 1008*b*, the network node may identify the accumulated sign of the at least one gradient update as negative if the first received power associated with the at least one first resource is less than the second received power associated with the at least one second resource. For example, 1008*b* may be performed by the component 199 in FIG. 12. Referring to FIG. 6, at 614b, the network node 604 may identify the accumulated sign of the at least one gradient update as negative if the first received power associated with the at least one first resource is less than the second received power associated with the at least one second resource.

In one configuration, at 1004, the network node may transmit, for the first UE, a configuration of the non-coherent orthogonal modulation scheme via at least one of an RRC message, a MAC-CE, an SI message, or a DCI message. The configuration of the non-coherent orthogonal modulation scheme may include a time configuration associated with the at least one pair of resources, a frequency configuration associated with the at least one pair of resources, or a beam configuration associated with the at least one pair of resources. For example, 1004 may be performed by the component 199 in FIG. 12. Referring to FIG. 6, at 608, the network node 604 may transmit, for the first UE 602, a configuration of the non-coherent orthogonal modulation scheme via at least one of an RRC message, a MAC-CE, an SI message, or a DCI message.

In one configuration, the configuration of the non-coherent orthogonal modulation scheme may further include an indication of pathloss-based power control for the non-coherent orthogonal modulation scheme.

In one configuration, the at least one first resource and the at least one second resource may be associated with one or more of a same QCL property, a same CC, or a same BWP.

In one configuration, the at least one gradient update may include a plurality of gradient updates. The at least one pair of resources may include a plurality of pairs of resources. Each gradient update in the plurality of gradient updates may be associated with a respective pair of resources in the plurality of pairs of resources.

In one configuration, at 1002, the network node may transmit, for the first UE, an indication of a gradient update reporting scheme. The gradient update reporting scheme may be selected between the non-coherent orthogonal modulation scheme or a coherent OTA channel aggregation scheme. For example, 1002 may be performed by the component 199 in FIG. 12. Referring to FIG. 6, at 606, the network node 604 may transmit, for the first UE 602, an indication of a gradient update reporting scheme.

Figure 11:
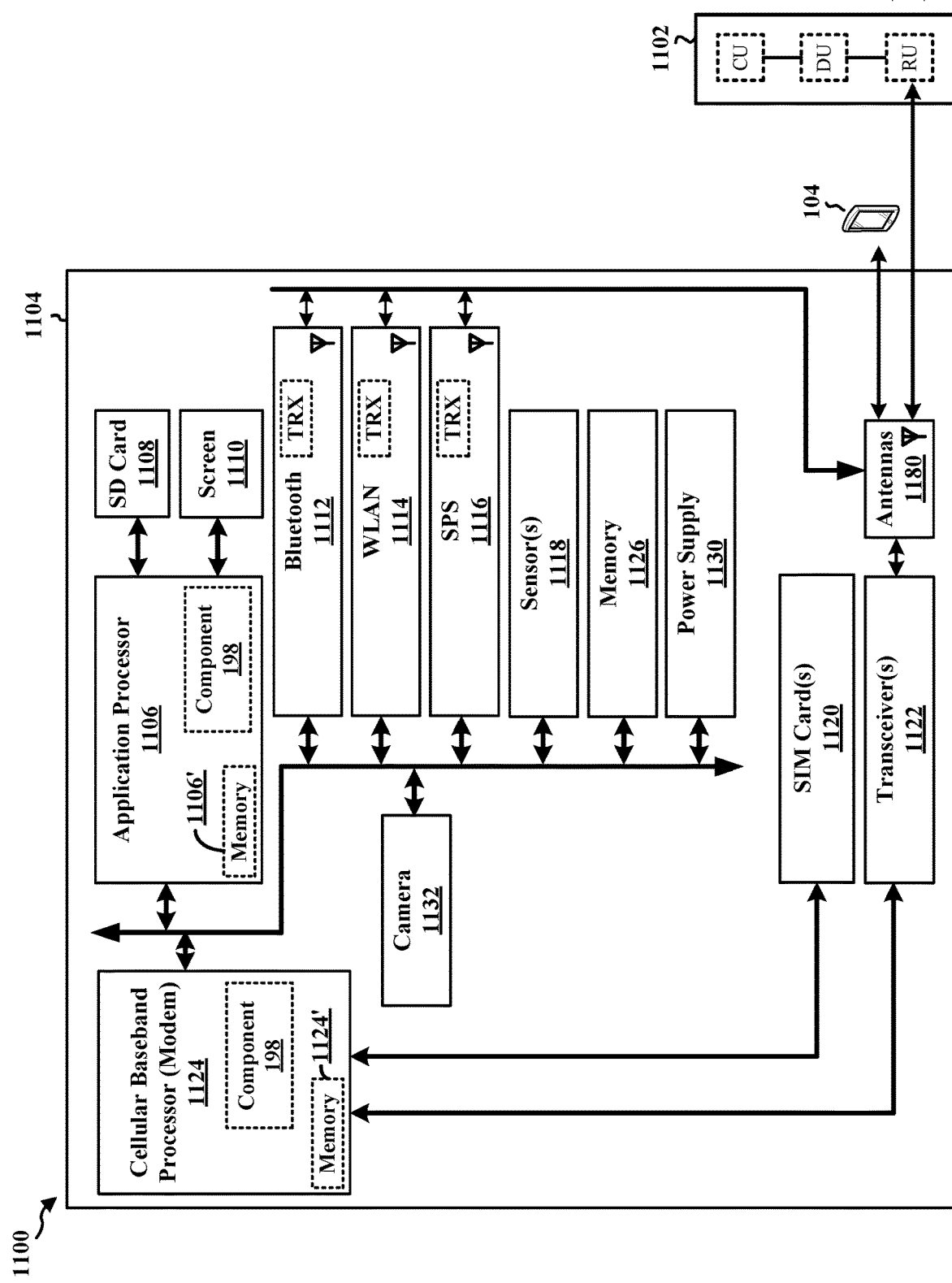
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see UE 350 of FIG. 3) and include the additional modules of the apparatus 1104.

As discussed supra, the component 198 may be configured to identify, in at least one round of a federated learning procedure, at least one gradient update based on local data and a local copy of a machine learning model associated with the federated learning procedure. The component 198 may be configured to transmit, in the at least one round of the federated learning procedure, for a network node, an indication of the at least one gradient update based on a sign of the at least one gradient update and a non-coherent orthogonal modulation scheme. The component 198 may be within the cellular baseband processor 1124, the application processor 1106, or both the cellular baseband processor 1124 and the application processor 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, may include means for identifying, in at least one round of a federated learning procedure, at least one gradient update based on local data and a local copy of a machine learning model associated with the federated learning procedure. The apparatus 1104, and in particular the cellular baseband processor 1124 and/or the application processor 1106, may include means for transmitting, in the at least one round of the federated learning procedure, for a network node, an indication of the at least one gradient update based on a sign of the at least one gradient update and a non-coherent orthogonal modulation scheme.

In one configuration, the means for transmitting, in the at least one round of the federated learning procedure, for the network node, the indication of the at least one gradient update may further configured to: identify at least one pair of resources associated with the non-coherent orthogonal modulation scheme, the at least one pair of resources including at least one first resource and at least one second resource; transmit, for the network node, a non-zero energy symbol via the at least one first resource and a zero energy symbol via the at least one second resource if the sign of the at least one gradient update is non-negative; and transmit, for the network node, the zero energy symbol via the at least one first resource and the non-zero energy symbol via the at least one second resource if the sign of the at least one gradient update is negative. In one configuration, the non-zero energy symbol may include a pseudorandom symbol. In one configuration, the apparatus 1104, and in particular the cellular baseband processor 1124 and/or the application processor 1106, may include means for receiving a configuration of the non-coherent orthogonal modulation scheme from the network node via at least one of an RRC message, a MAC-CE, an SI message, or a DCI message. The configuration of the non-coherent orthogonal modulation scheme may include a time configuration associated with the at least one pair of resources, a frequency configuration associated with the at least one pair of resources, or a beam configuration associated with the at least one pair of resources. In one configuration, the configuration of the non-coherent orthogonal modulation scheme may further include an indication of pathloss-based power control for the non-coherent orthogonal modulation scheme. In one configuration, the at least one first resource and the at least one second resource may be associated with one or more of a same QCL property, a same CC, or a same BWP. In one configuration, the at least one gradient update may include a plurality of gradient updates. The at least one pair of resources may include a plurality of pairs of resources. Each gradient update in the plurality of gradient updates may be associated with a respective pair of resources in the plurality of pairs of resources. In one configuration, the apparatus 1104, and in particular the cellular baseband processor 1124 and/or the application processor 1106, may include means for receiving an indication of a gradient update reporting scheme from the network node. The gradient update reporting scheme may be selected between the non-coherent orthogonal modulation scheme or a coherent OTA channel aggregation scheme.

The means may be the component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
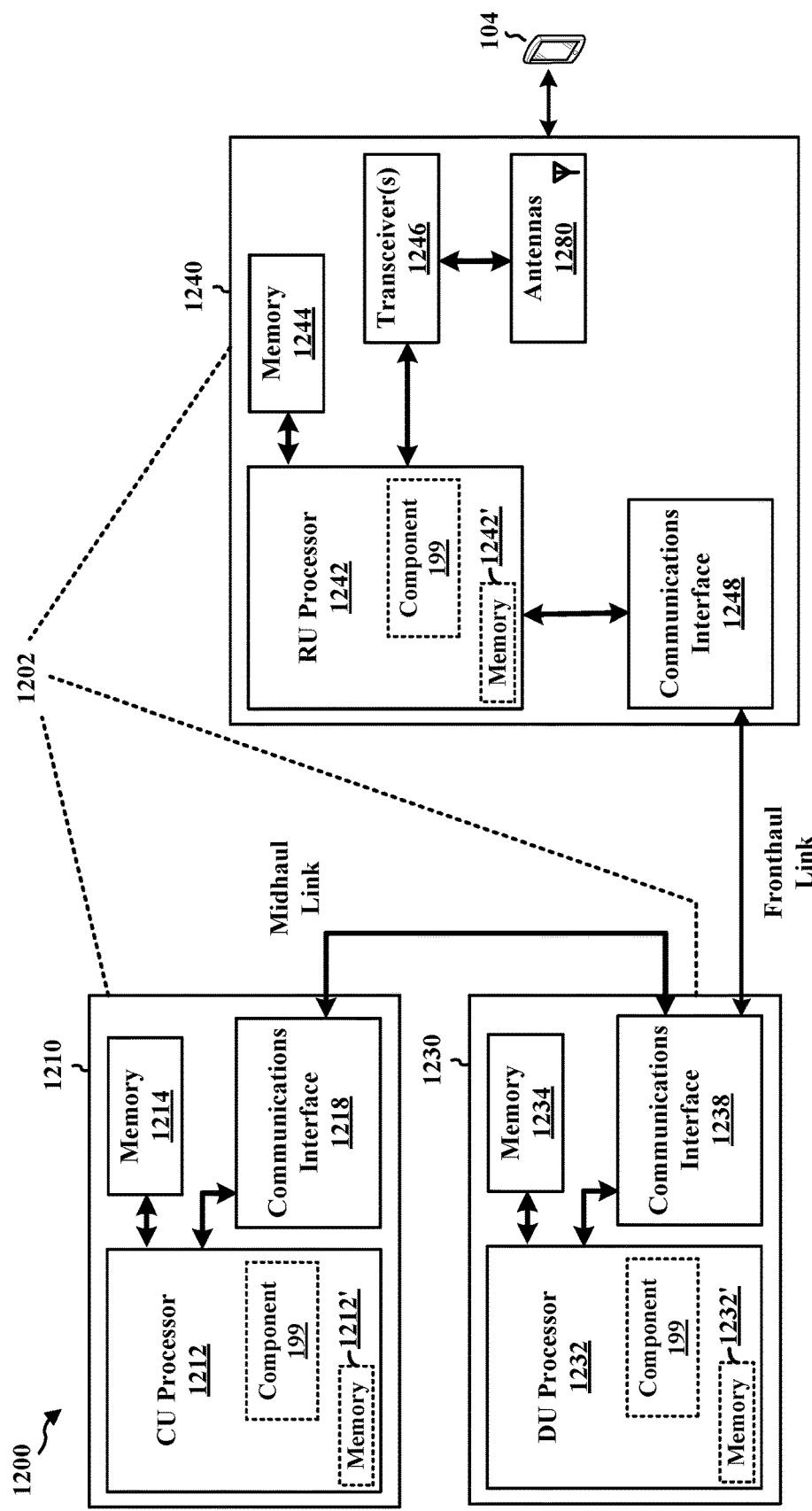
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive, in at least one round of a federated learning procedure, at least one first superimposed symbol associated with at least one gradient update via at least one first resource and at least one second superimposed symbol associated with the at least one gradient update via at least one second resource from a plurality of UEs including a first UE. The at least one first resource and the at least one second resource may be included in at least one pair of resources associated with a non-coherent orthogonal modulation scheme. The component 199 may be configured to identify, in the at least one round of the federated learning procedure, an accumulated sign of the at least one gradient update based on a first received power associated with the at least one first resource and a second received power associated with the at least one second resource. The component 199 may be configured to update, in the at least one round of the federated learning procedure, a machine learning model associated with the federated learning procedure based on the accumulated sign of the at least one gradient update. The component 199 may be within one or more processors of one or more of the CU 1210, DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 may include means for receiving, in at least one round of a federated learning procedure, at least one first superimposed symbol associated with at least one gradient update via at least one first resource and at least one second superimposed symbol associated with the at least one gradient update via at least one second resource from a plurality of UEs including a first UE. The at least one first resource and the at least one second resource may be included in at least one pair of resources associated with a non-coherent orthogonal modulation scheme. The network entity 1202 may include means for identifying, in the at least one round of the federated learning procedure, an accumulated sign of the at least one gradient update based on a first received power associated with the at least one first resource and a second received power associated with the at least one second resource. The network entity 1202 may include means for updating, in the at least one round of the federated learning procedure, a machine learning model associated with the federated learning procedure based on the accumulated sign of the at least one gradient update.

In one configuration, the means for identifying, in the at least one round of the federated learning procedure, the accumulated sign of the at least one gradient update may be further configured to: identify the accumulated sign of the at least one gradient update as positive if the first received power associated with the at least one first resource is greater than the second received power associated with the at least one second resource; and identify the accumulated sign of the at least one gradient update as negative if the first received power associated with the at least one first resource is less than the second received power associated with the at least one second resource. In one configuration, the network entity 1202 may include means for transmitting, for the first UE, a configuration of the non-coherent orthogonal modulation scheme via at least one of an RRC message, a MAC-CE, an SI message, or a DCI message. The configuration of the non-coherent orthogonal modulation scheme may include a time configuration associated with the at least one pair of resources, a frequency configuration associated with the at least one pair of resources, or a beam configuration associated with the at least one pair of resources. In one configuration, the configuration of the non-coherent orthogonal modulation scheme may further include an indication of pathloss-based power control for the non-coherent orthogonal modulation scheme. In one configuration, the at least one first resource and the at least one second resource may be associated with one or more of a same QCL property, a same CC, or a same BWP. In one configuration, the at least one gradient update may include a plurality of gradient updates. The at least one pair of resources may include a plurality of pairs of resources. Each gradient update in the plurality of gradient updates may be associated with a respective pair of resources in the plurality of pairs of resources. In one configuration, the network entity 1202 may include means for transmitting, for the first UE, an indication of a gradient update reporting scheme. The gradient update reporting scheme may be selected between the non-coherent orthogonal modulation scheme or a coherent OTA channel aggregation scheme.

The means may be the component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

Referring back to FIGS. 4-12, a UE may identify, in at least one round of a federated learning procedure, at least one gradient update based on local data and a local copy of a machine learning model associated with the federated learning procedure. The UE may transmit, in the at least one round of the federated learning procedure, for a network node, an indication of the at least one gradient update based on a sign of the at least one gradient update and a non-coherent orthogonal modulation scheme. Accordingly, the network node may receive, in at least one round of a federated learning procedure, at least one first superimposed symbol associated with at least one gradient update via at least one first resource and at least one second superimposed symbol associated with the at least one gradient update via at least one second resource from a plurality of UEs including a first UE. The at least one first resource and the at least one second resource may be included in at least one pair of resources associated with a non-coherent orthogonal modulation scheme. The network node may identify, in the at least one round of the federated learning procedure, an accumulated sign of the at least one gradient update based on a first received power associated with the at least one first resource and a second received power associated with the at least one second resource. The network node may update, in the at least one round of the federated learning procedure, a machine learning model associated with the federated learning procedure based on the accumulated sign of the at least one gradient update. Accordingly, the UEs may transmit indications of the gradient updates to the network node without having the full CSI and without performing channel pre-compensation.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including identifying, in at least one round of a federated learning procedure, at least one gradient update based on local data and a local copy of a machine learning model associated with the federated learning procedure; and transmitting, in the at least one round of the federated learning procedure, for a network node, an indication of the at least one gradient update based on a sign of the at least one gradient update and a non-coherent orthogonal modulation scheme.

Aspect 2 is the method of aspect 1, where transmitting, in the at least one round of the federated learning procedure, for the network node, the indication of the at least one gradient update further includes identifying at least one pair of resources associated with the non-coherent orthogonal modulation scheme, the at least one pair of resources including at least one first resource and at least one second resource; transmitting, for the network node, a non-zero energy symbol via the at least one first resource and a zero energy symbol via the at least one second resource if the sign of the at least one gradient update is non-negative; and transmitting, for the network node, the zero energy symbol via the at least one first resource and the non-zero energy symbol via the at least one second resource if the sign of the at least one gradient update is negative.

Aspect 3 is the method of aspect 2, where the non-zero energy symbol includes a pseudorandom symbol.

Aspect 4 is the method of any of aspects 2 and 3, further including: receiving a configuration of the non-coherent orthogonal modulation scheme from the network node via at least one of an RRC message, a MAC-CE, an SI message, or a DCI message, the configuration of the non-coherent orthogonal modulation scheme including a time configuration associated with the at least one pair of resources, a frequency configuration associated with the at least one pair of resources, or a beam configuration associated with the at least one pair of resources.

Aspect 5 is the method of aspect 4, where the configuration of the non-coherent orthogonal modulation scheme further includes an indication of pathloss-based power control for the non-coherent orthogonal modulation scheme.

Aspect 6 is the method of any of aspects 2 to 5, where the at least one first resource and the at least one second resource are associated with one or more of a same QCL property, a same CC, or a same BWP.

Aspect 7 is the method of any of aspects 2 to 6, where the at least one gradient update includes a plurality of gradient updates, the at least one pair of resources include a plurality of pairs of resources, and each gradient update in the plurality of gradient updates is associated with a respective pair of resources in the plurality of pairs of resources.

Aspect 8 is the method of any of aspects 2 to 7, further including: receiving an indication of a gradient update reporting scheme from the network node, the gradient update reporting scheme being selected between the non-coherent orthogonal modulation scheme or a coherent OTA channel aggregation scheme.

Aspect 9 is a method of wireless communication at a network node, including receiving, in at least one round of a federated learning procedure, at least one first superimposed symbol associated with at least one gradient update via at least one first resource and at least one second superimposed symbol associated with the at least one gradient update via at least one second resource from a plurality of UEs including a first UE, the at least one first resource and the at least one second resource being included in at least one pair of resources associated with a non-coherent orthogonal modulation scheme; identifying, in the at least one round of the federated learning procedure, an accumulated sign of the at least one gradient update based on a first received power associated with the at least one first resource and a second received power associated with the at least one second resource; and updating, in the at least one round of the federated learning procedure, a machine learning model associated with the federated learning procedure based on the accumulated sign of the at least one gradient update.

Aspect 10 is the method of aspect 9, where identifying, in the at least one round of the federated learning procedure, the accumulated sign of the at least one gradient update further includes identifying the accumulated sign of the at least one gradient update as positive if the first received power associated with the at least one first resource is greater than the second received power associated with the at least one second resource; and identifying the accumulated sign of the at least one gradient update as negative if the first received power associated with the at least one first resource is less than the second received power associated with the at least one second resource.

Aspect 11 is the method of any of aspects 9 and 10, further including: transmitting, for the first UE, a configuration of the non-coherent orthogonal modulation scheme via at least one of an RRC message, a MAC-CE, an SI message, or a DCI message, the configuration of the non-coherent orthogonal modulation scheme including a time configuration associated with the at least one pair of resources, a frequency configuration associated with the at least one pair of resources, or a beam configuration associated with the at least one pair of resources.

Aspect 12 is the method of aspect 11, where the configuration of the non-coherent orthogonal modulation scheme further includes an indication of pathloss-based power control for the non-coherent orthogonal modulation scheme.

Aspect 13 is the method of any of aspects 9 to 12, where the at least one first resource and the at least one second resource are associated with one or more of a same QCL property, a same CC, or a same BWP.

Aspect 14 is the method of any of aspects 9 to 13, where the at least one gradient update includes a plurality of gradient updates, the at least one pair of resources include a plurality of pairs of resources, and each gradient update in the plurality of gradient updates is associated with a respective pair of resources in the plurality of pairs of resources.

Aspect 15 is the method of any of aspects 9 to 14, further including: transmitting, for the first UE, an indication of a gradient update reporting scheme, the gradient update reporting scheme being selected between the non-coherent orthogonal modulation scheme or a coherent OTA channel aggregation scheme.

Aspect 16 is an apparatus for wireless communication including at least one processor coupled to a memory and, based at least in part on information stored in the memory, the at least one processor is configured to implement a method as in any of aspects 1 to 15.

Aspect 17 may be combined with aspect 16 and further includes a transceiver coupled to the at least one processor.

Aspect 18 is an apparatus for wireless communication including means for implementing any of aspects 1 to 15.

Aspect 19 is a non-transitory computer-readable storage medium storing computer executable code, where the code when executed by a processor causes the processor to implement any of aspects 1 to 15.

Various aspects have been described herein. These and other aspects are within the scope of the following claims.

What is claimed is:

1. An apparatus for wireless communication at a user equipment (UE), comprising:
    a memory; and
    at least one processor coupled to the memory and, based at least in part on information stored in the memory, the at least one processor is configured to:
        identify, in at least one round of a federated learning procedure, at least one gradient update based on local data and a local copy of a machine learning model associated with the federated learning procedure;
        identify at least one pair of resources associated with a non-coherent orthogonal modulation scheme; and
        transmit, in the at least one round of the federated learning procedure, for a network node, an indication of the at least one gradient update based on a sign of the at least one gradient update and via the at least one pair of resources associated with the non-coherent orthogonal modulation scheme.

2. The apparatus of claim 1, wherein the at least one pair of resources includes at least one first resource and at least one second resource, and wherein to transmit, in the at least one round of the federated learning procedure, for the network node, the indication of the at least one gradient update, the at least one processor is further configured to:
    transmit, for the network node, a non-zero energy symbol via the at least one first resource and a zero energy symbol via the at least one second resource if the sign of the at least one gradient update is non-negative; and
    transmit, for the network node, the zero energy symbol via the at least one first resource and the non-zero energy symbol via the at least one second resource if the sign of the at least one gradient update is negative.

3. The apparatus of claim 2, wherein the non-zero energy symbol comprises a pseudorandom symbol.

4. The apparatus of claim 2, the at least one processor being further configured to:
    receive a configuration of the non-coherent orthogonal modulation scheme from the network node via at least one of a radio resource control (RRC) message, a medium access control-control element (MAC-CE), a system information (SI) message, or a downlink control information (DCI) message, the configuration of the non-coherent orthogonal modulation scheme including a time configuration associated with the at least one pair of resources, a frequency configuration associated with the at least one pair of resources, or a beam configuration associated with the at least one pair of resources.

5. The apparatus of claim 4, wherein the configuration of the non-coherent orthogonal modulation scheme further includes an indication of pathloss-based power control for the non-coherent orthogonal modulation scheme.

6. The apparatus of claim 2, wherein the at least one first resource and the at least one second resource are associated with one or more of a same quasi co-location (QCL) property, a same component carrier (CC), or a same bandwidth part (BWP).

7. The apparatus of claim 2, wherein the at least one gradient update includes a plurality of gradient updates, the at least one pair of resources include a plurality of pairs of resources, and each gradient update in the plurality of gradient updates is associated with a respective pair of resources in the plurality of pairs of resources.

8. The apparatus of claim 2, the at least one processor being further configured to:
    receive an indication of a gradient update reporting scheme from the network node, the gradient update reporting scheme being selected between the non-coherent orthogonal modulation scheme or a coherent over-the-air (OTA) channel aggregation scheme.

9. The apparatus of claim 1, further comprising a transceiver coupled to the at least one processor, the transceiver being configured to transmit, in the at least one round of the federated learning procedure, for the network node, the indication of the at least one gradient update.

10. A method of wireless communication at a user equipment (UE), comprising:
    identifying, in at least one round of a federated learning procedure, at least one gradient update based on local data and a local copy of a machine learning model associated with the federated learning procedure;
    identifying at least one pair of resources associated with a non-coherent orthogonal modulation scheme; and
    transmitting, in the at least one round of the federated learning procedure, for a network node, an indication of the at least one gradient update based on a sign of the at least one gradient update and via the at least one pair of resources associated with the non-coherent orthogonal modulation scheme.

11. The method of claim 10, wherein the at least one pair of resources includes at least one first resource and at least one second resource, and wherein transmitting, in the at least one round of the federated learning procedure, for the network node, the indication of the at least one gradient update further comprises:
    transmitting, for the network node, a non-zero energy symbol via the at least one first resource and a zero energy symbol via the at least one second resource if the sign of the at least one gradient update is non-negative; and transmitting, for the network node, the zero energy symbol via the at least one first resource and the non-zero energy symbol via the at least one second resource if the sign of the at least one gradient update is negative.

12. The method of claim 11, wherein the non-zero energy symbol comprises a pseudorandom symbol.

13. The method of claim 11, further comprising:

receiving a configuration of the non-coherent orthogonal modulation scheme from the network node via at least one of a radio resource control (RRC) message, a medium access control-control element (MAC-CE), a system information (SI) message, or a downlink control information (DCI) message, the configuration of the non-coherent orthogonal modulation scheme including a time configuration associated with the at least one pair of resources, a frequency configuration associated with the at least one pair of resources, or a beam configuration associated with the at least one pair of resources.

14. The method of claim 13, wherein the configuration of the non-coherent orthogonal modulation scheme further includes an indication of pathloss-based power control for the non-coherent orthogonal modulation scheme.

15. The method of claim 11, wherein the at least one first resource and the at least one second resource are associated with one or more of a same quasi co-location (QCL) property, a same component carrier (CC), or a same bandwidth part (BWP).

16. An apparatus for wireless communication at a network node, comprising:

a memory; and at least one processor coupled to the memory and, based at least in part on information stored in the memory, the at least one processor is configured to:

receive, in at least one round of a federated learning procedure, at least one first superimposed symbol associated with at least one gradient update via at least one first resource and at least one second superimposed symbol associated with the at least one gradient update via at least one second resource from a plurality of user equipment (UEs) including a first UE, the at least one first resource and the at least one second resource being included in at least one pair of resources associated with a non-coherent orthogonal modulation scheme;

identify, in the at least one round of the federated learning procedure, an accumulated sign of the at least one gradient update based on a first received power associated with the at least one first resource and a second received power associated with the at least one second resource; and update, in the at least one round of the federated learning procedure, a machine learning model associated with the federated learning procedure based on the accumulated sign of the at least one gradient update.

17. The apparatus of claim 16, wherein to identify, in the at least one round of the federated learning procedure, the accumulated sign of the at least one gradient update, the at least one processor is further configured to:

identify the accumulated sign of the at least one gradient update as positive if the first received power associated with the at least one first resource is greater than the second received power associated with the at least one second resource; and identify the accumulated sign of the at least one gradient update as negative if the first received power associated with the at least one first resource is less than the second received power associated with the at least one second resource.

18. The apparatus of claim 16, the at least one processor being further configured to:

transmit, for the first UE, a configuration of the non-coherent orthogonal modulation scheme via at least one of a radio resource control (RRC) message, a medium access control-control element (MAC-CE), a system information (SI) message, or a downlink control information (DCI) message, the configuration of the non-coherent orthogonal modulation scheme including a time configuration associated with the at least one pair of resources, a frequency configuration associated with the at least one pair of resources, or a beam configuration associated with the at least one pair of resources.

19. The apparatus of claim 18, wherein the configuration of the non-coherent orthogonal modulation scheme further includes an indication of pathloss-based power control for the non-coherent orthogonal modulation scheme.

20. The apparatus of claim 16, wherein the at least one first resource and the at least one second resource are associated with one or more of a same quasi co-location (QCL) property, a same component carrier (CC), or a same bandwidth part (BWP).

21. The apparatus of claim 16, wherein the at least one gradient update includes a plurality of gradient updates, the at least one pair of resources include a plurality of pairs of resources, and each gradient update in the plurality of gradient updates is associated with a respective pair of resources in the plurality of pairs of resources.

22. The apparatus of claim 16, the at least one processor being further configured to:

transmit, for the first UE, an indication of a gradient update reporting scheme, the gradient update reporting scheme being selected between the non-coherent orthogonal modulation scheme or a coherent over-the-air (OTA) channel aggregation scheme.

23. The apparatus of claim 16, further comprising a transceiver coupled to the at least one processor, the transceiver being configured to receive, in the at least one round of the federated learning procedure, the at least one first superimposed symbol associated with the at least one gradient update via the at least one first resource and the at least one second superimposed symbol associated with the at least one gradient update via the at least one second resource from the plurality of UEs.

24. A method of wireless communication at a network node, comprising:

receiving, in at least one round of a federated learning procedure, at least one first superimposed symbol associated with at least one gradient update via at least one first resource and at least one second superimposed symbol associated with the at least one gradient update via at least one second resource from a plurality of user equipment (UEs) including a first UE, the at least one first resource and the at least one second resource being included in at least one pair of resources associated with a non-coherent orthogonal modulation scheme;

identifying, in the at least one round of the federated learning procedure, an accumulated sign of the at least one gradient update based on a first received power associated with the at least one first resource and a second received power associated with the at least one second resource; and updating, in the at least one round of the federated learning procedure, a machine learning model associated with the federated learning procedure based on the accumulated sign of the at least one gradient update.

25. The method of claim 24, wherein identifying, in the at least one round of the federated learning procedure, the accumulated sign of the at least one gradient update further comprises:

identifying the accumulated sign of the at least one gradient update as positive if the first received power associated with the at least one first resource is greater than the second received power associated with the at least one second resource; and identifying the accumulated sign of the at least one gradient update as negative if the first received power associated with the at least one first resource is less than the second received power associated with the at least one second resource.

26. The method of claim 24, further comprising:

transmitting, for the first UE, a configuration of the non-coherent orthogonal modulation scheme via at least one of a radio resource control (RRC) message, a medium access control-control element (MAC-CE), a system information (SI) message, or a downlink control information (DCI) message, the configuration of the non-coherent orthogonal modulation scheme including a time configuration associated with the at least one pair of resources, a frequency configuration associated with the at least one pair of resources, or a beam configuration associated with the at least one pair of resources.

27. The method of claim 26, wherein the configuration of the non-coherent orthogonal modulation scheme further includes an indication of pathloss-based power control for the non-coherent orthogonal modulation scheme.

28. The method of claim 24, wherein the at least one first resource and the at least one second resource are associated with one or more of a same quasi co-location (QCL) property, a same component carrier (CC), or a same bandwidth part (BWP).

29. The method of claim 24, wherein the at least one gradient update includes a plurality of gradient updates, the at least one pair of resources include a plurality of pairs of resources, and each gradient update in the plurality of gradient updates is associated with a respective pair of resources in the plurality of pairs of resources.

30. The method of claim 24, further comprising:

transmitting, for the first UE, an indication of a gradient update reporting scheme, the gradient update reporting scheme being selected between the non-coherent orthogonal modulation scheme or a coherent over-the-air (OTA) channel aggregation scheme.

* * * * *